United States Patent
Andrew et al.

(10) Patent No.: US 8,121,494 B2
(45) Date of Patent: Feb. 21, 2012

(54) SYSTEM AND METHOD FOR RECEIVING HIGH SPECTRAL EFFICIENCY OPTICAL DPSK SIGNALS

(75) Inventors: Chraplyvy R Andrew, Matawan, NJ (US); Xiang Liu, Marlboro, NJ (US); Chandrasekhar Sethumadhavan, Matawan, NJ (US)

(73) Assignee: Alcatel Lucent, Paris (FR)

( * ) Notice: Subject to any disclaimer, the term of this patent is extended or adjusted under 35 U.S.C. 154(b) by 683 days.

(21) Appl. No.: 12/194,241

(22) Filed: Aug. 19, 2008

(65) Prior Publication Data

US 2010/0046948 A1 Feb. 25, 2010

(51) Int. Cl.
*H04B 10/06* (2006.01)
(52) U.S. Cl. ........ 398/202; 398/212; 398/213; 398/208; 398/209; 398/183; 398/188
(58) Field of Classification Search .................. 398/183, 398/188, 202, 212, 208, 209, 213, 214, 158, 398/159, 25, 26, 27, 38, 79, 160
See application file for complete search history.

(56) References Cited

U.S. PATENT DOCUMENTS

| | | | |
|---|---|---|---|
| 7,477,852 | B2 | 1/2009 | Agarwal et al. |
| 2006/0171720 | A1* | 8/2006 | Agarwal et al. ............... 398/186 |
| 2006/0193639 | A1 | 8/2006 | Liu et al. |
| 2007/0196110 | A1 | 8/2007 | Mikkelsen et al. |
| 2008/0226306 | A1* | 9/2008 | Heffner et al. ............... 398/202 |

OTHER PUBLICATIONS

J. Hsieh et al., Athermal Demodulator for 42.7-Gb/s DPSK Signals, ECOC 2005, Th. 1.5.6.
B. Mikkelsen et al., Partial DPSK with excellent filter tolerance and OSNR sensitivity, Electronics Letters, vol. 42, No. 23, Nov. 9, 2006.
X. Liu et al., Athermal Optical Demodulator for OC-768 DPSK and RZ-DPSK Signals, IEEE Photonics Tech. Letters, vol. 17, No. 12, Dec. 2005.
C. Malouin et al., Differential Phase-Shift Keying Receiver Design Applied to Strong Optical Filtering, Journal of Lightwave Technology, vol. 25, No. 11, Nov. 2007.
A. Agarwal et al., Experimental Study of Photocurrent Imbalance in a 42.7-Gb/s DPSK Receiver under Strong Optical Filtering, Optical Fiber Comm. Conf. 2005, vol. 5, Mar. 6, 2005.

* cited by examiner

*Primary Examiner* — Hanh Phan
(74) *Attorney, Agent, or Firm* — Brosemer, Kolefas & Assoc.

(57) ABSTRACT

Apparatus and methods are provided for receiving differential phase-shift keyed (DPSK) optical signals subjected to tight optical filtering, such as may be experienced by 40 Gb/s and 100 Gb/s channels in a dense wavelength division multiplexing (DWDM) communications system with 50 GHz channel spacing. An optical DPSK receiver is described which employs an optical delay interferometer (ODI) demodulator having a free spectral range (FSR) that is larger than the symbol rate (SR) of the DPSK signal to be demodulated. The receiver includes means for introducing an additional power imbalance between the outputs of the ODI demodulator, and the additional power imbalance may be related to the ratio of FSR to SR. The additional power imbalance increases the signal tolerance to tight optical filtering, thereby achieving high spectral efficiency in applications such as DWDM.

16 Claims, 5 Drawing Sheets

SYSTEM AND METHOD FOR RECEIVING HIGH SPECTRAL EFFICIENCY OPTICAL DPSK SIGNALS

FIELD OF THE INVENTION

The present invention relates to the field of optical communications, and more specifically to apparatus and methods related to the reception of differential phase shift keyed optical signals transmitted with high spectral efficiency.

BACKGROUND INFORMATION

Optical differential phase-shift keying (DPSK) is a promising modulation format that offers high receiver sensitivity, high tolerance to major nonlinear effects in high-speed transmissions, and high tolerance to coherent crosstalk. In optical DPSK transmission, data information is conveyed by the optical phase difference between adjacent bits. Optical DPSK modulation includes differential binary phase shift keying (DBPSK), differential quadrature phase shift keying (DQPSK), and other related format variants.

To increase the capacity of optical transport networks, 40-Gb/s channels are being considered to replace the 10-Gb/s channels currently carried on these networks. Most of the core transport networks_are based on dense wavelength-division multiplexing (DWDM) with a channel spacing of 50 GHz, as specified by the International Telecommunication Union (ITU). This spacing is illustrated schematically in FIG. 1A, with $\Delta f_{min}$=50 GHz. Due to the much wider optical spectrum of a 40-Gb/s DBPSK signal, as compared to that of a typical 10-Gb/s signal, there is a severe penalty due to the tight optical filtering when transmitting the 40-Gb/s binary signals over the 50-GHz channel grid. This filtering penalty becomes even larger when multiple reconfigurable optical add/drop multiplexers (ROADMs) incorporating elements such as wavelength selective switches (WSS) are also inserted in the transmission system, as is common in most of today's transparent optical networks, such as that schematically depicted in FIG. 1B. For example, in the network 10 illustrated, a signal may be routed via multiple ROADM/WSS 11-14 between its origin 21 and its destination 22. This makes it difficult to transmit, with high spectral efficiency, such high-speed DPSK signals in a typical DWDM system.

An existing approach to achieve high spectral efficiency is to use bandwidth-efficient modulation formats such as DQPSK and duobinary. DQPSK, however, requires more complex and expensive transmitters and receivers, and duobinary has poorer receiver sensitivity than DBPSK and DQPSK.

SUMMARY OF THE INVENTION

In an exemplary embodiment, the present invention provides an optical differential phase-shift keying (DPSK) receiver which employs an optical delay interferometer (ODI) to demodulate a received optical DPSK signal. In accordance with the present invention, the ODI demodulator has a free spectral range (FSR) that is larger than the symbol rate (SR) of the DPSK signal to be demodulated. Moreover, the receiver includes means for introducing an additional power imbalance between the signals corresponding to the two outputs of the ODI demodulator, wherein the additional power imbalance is related to the ratio of FSR to SR. When judiciously chosen, the additional power imbalance increases the signal tolerance to tight optical filtering, thereby achieving high spectral efficiency in applications such as dense wavelength-division multiplexing (DWDM). The additional power imbalance can be implemented electrically, using electrical attenuation or amplification circuitry, or optically, using optical attenuation. The introduced power imbalance can be fixed or adjustable. In order to accommodate the potential ambiguity in the polarity of the received data, polarity detection and recovery circuitry may also be used.

Embodiments of the present invention can be applied, for example, to the transmission of 40-Gb/s differential binary phase shift keying (DBPSK) signals over a 50-GHz DWDM grid, as well as 100-Gb/s differential quadrature phase-shift keying (DQPSK) signals over a 50-GHz grid. Such embodiments enable 40-Gb/s DBPSK and 100-Gb/s DQPSK signals to be carried over DWDM systems having a 50-GHz minimum channel spacing with improved performance in terms of system reach and ROADM support.

Further embodiments of the present invention also provide other benefits such as adaptively optimizing the performance of the signal reception under different filtering conditions by adjusting the power ratio without changing the delay or FSR of the ODI, thereby making the signal reception hitless or free of interruption.

The aforementioned and other features and aspects of the present invention are described in greater detail below.

DETAILED DESCRIPTION

Figure 1A:
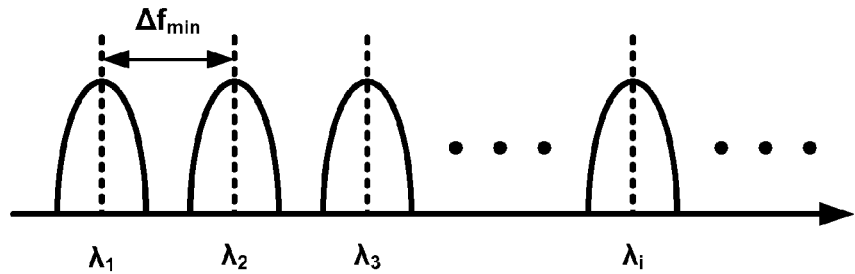
FIG. 1A illustrates the channel spacing in a dense wavelength-division multiplexing (DWDM) scheme.
Figure 1B:
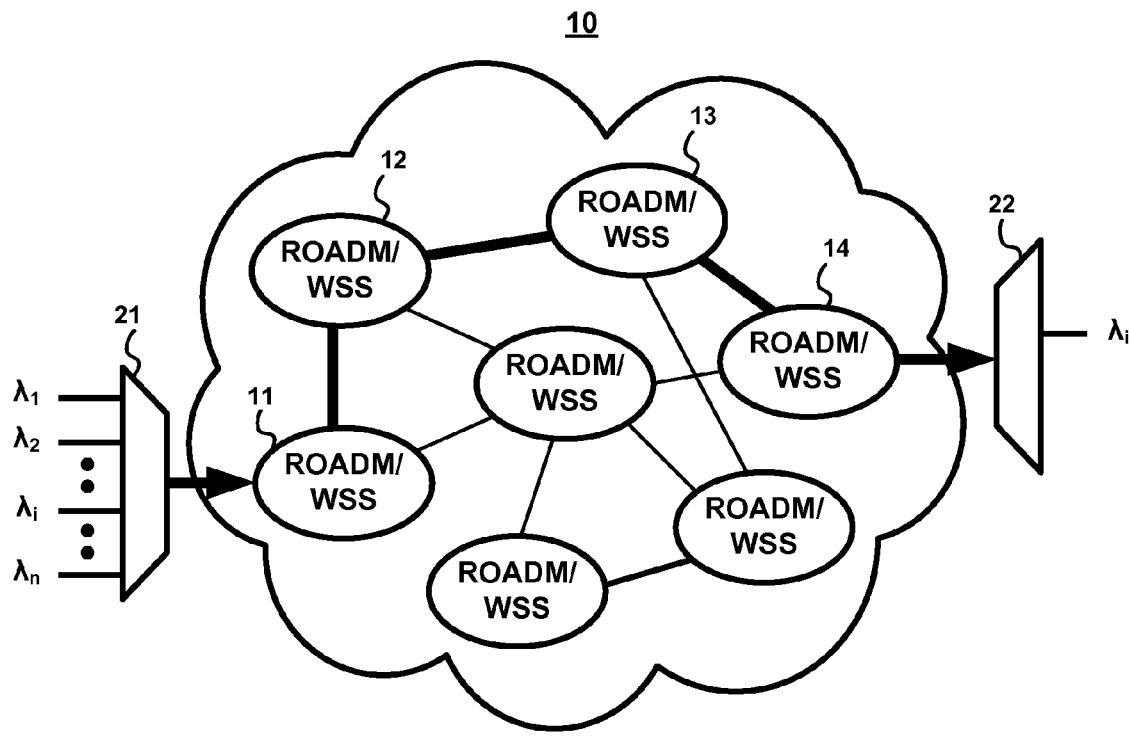
FIG. 1B is a schematic representation of a typical optical network with multiple reconfigurable optical add/drop multiplexers (ROADMs) and wavelength selective switches (WSS).
Figure 2:
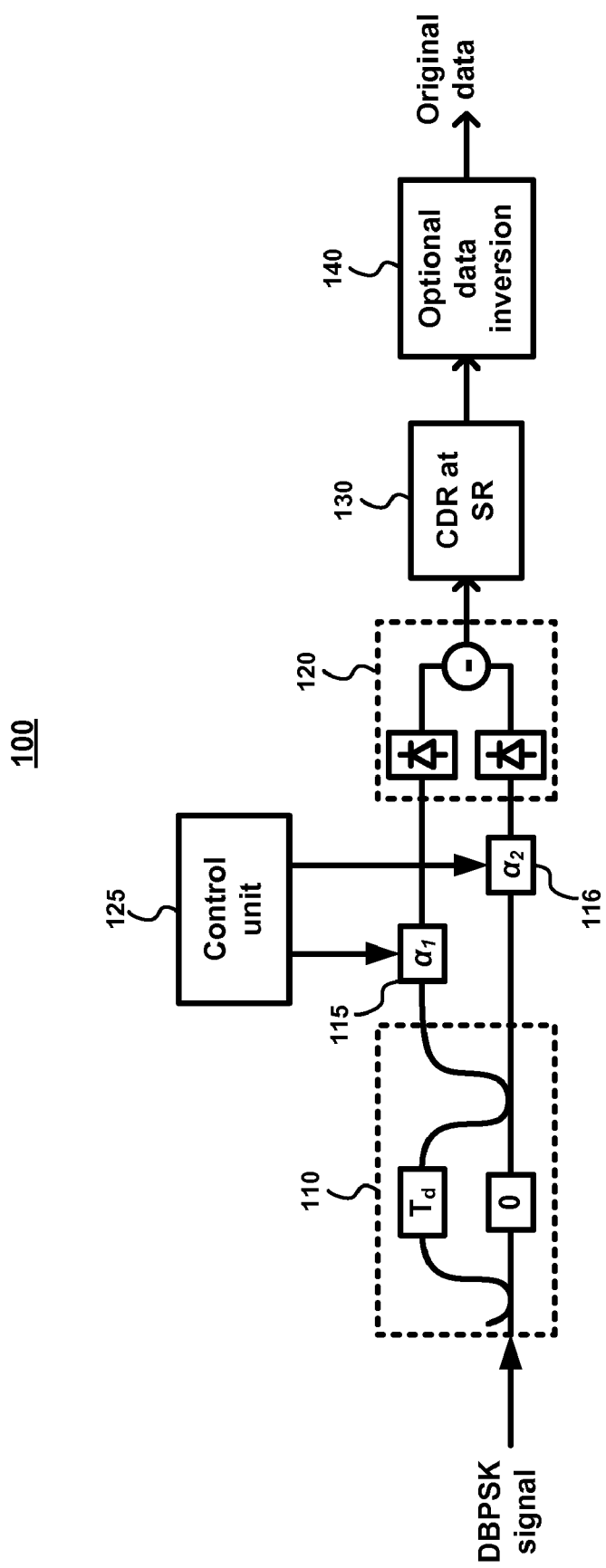
FIG. 2 is a block diagram of an exemplary embodiment of a differential binary phase shift keying (DBPSK) receiver comprising an optical power imbalance module.

FIG. 2 is a block diagram of an exemplary embodiment of a differential binary phase shift keying (DBPSK) receiver 100 in accordance with the present invention. It is contemplated that the receiver 100 can be used, for example, to receive DBPSK signals, whose data rate is nominally 43 Gb/s and can range from about 40 Gb/s to 50 Gb/s, transmitted over a dense wavelength-division multiplexing DWDM system (FIG. 1B) with 50-GHz minimum channel spacing $\Delta f_{min}$=50 GHz (FIG. 1A).

The receiver 100 comprises an optical delay interferometer (ODI) 110 for demodulating a received optical DBPSK signal at its input. In general, an ODI has two optical paths with different lengths. The length difference between the two paths causes a time delay $T_d$ between the optical signals traveling along the two paths, and the delay equals the reciprocal of the free spectral range (FSR) of the ODI, i.e., FSR=$1/T_d$. In accordance with the present invention, the ODI 110 has an FSR that is greater than the symbol rate (SR) of the DBPSK signal to be demodulated. In a exemplary embodiment in accordance with the present invention, the FSR is preferably in a range of:

$$1.15\,SR \leq FSR \leq 2.5\,SR, \qquad (1)$$

where FSR is in units of GHz and SR is in units of Gbaud.

The constructive output port of the ODI 110 is coupled via an optical attenuator 115 to a first input of a balanced detector 120, whereas the destructive output port of the ODI 110 is coupled via a second optical attenuator 116 to a second input of the balanced detector 120. The optical attenuators 115 and 116, with variable attenuation $\alpha_1$ and $\alpha_2$ respectively, are controlled by a control unit 125 to adjust the ratio of signal powers associated with the ODI constructive and destructive ports, $P_{con}$ and $P_{des}$, respectively. The attenuators 115 and 116 introduce an incremental power imbalance, or change in the power ratio between the signals which is additional to the natural power ratio when the powers of the two signals are not thusly modified. For example, the additional adjustment of the power ratio $P_{con}/P_{des}$ introduced by the attenuators 115 and 116 may be between −6 dB and 2 dB, depending on the degree of optical filtering to which the received DBPSK signal has been subjected, with more attenuation preferably introduced for less filtering. Here, an adjustment of 2 dB of the power ratio $P_{con}/P_{des}$ means a relative increase of $P_{con}$ over $P_{des}$ by 2 dB, or by about 58%. As such, signal performance can be optimized under different filtering conditions adaptively (without changing the delay or FSR of the ODI) by adjusting the power ratio.

Although the exemplary embodiment of FIG. 2 shows an optical attenuator coupled to each of the constructive and destructive ports of the ODI 110, it is possible in accordance with the present invention to have alternative embodiments with an attenuator coupled to only one of the ODI ports. For instance, if the additional adjustment of the power ratio $P_{con}/P_{des}$ is to be less than zero (i.e., only the signal of the constructive port need be attenuated), the attenuator 116 can be eliminated.

Moreover, for applications in which it is not necessary to vary the attenuation (e.g., the filtering conditions are substantially constant), attenuation can be realized, for example, with a fixed attenuator or by imperfect optical coupling in at least one of the output ports of the ODI 110. Using well known techniques, the optical coupling can be set upon fabrication to provide the desired degree of attenuation.

The output of the balanced detector 120 is provided to a clock and data recovery (CDR) circuit 130, which recovers the data encoded in the received signal and a clock at the symbol rate (SR). In order to accommodate the potential ambiguity in the polarity of the received data, a data inversion circuit 140 may also be included to invert the data recovered by the CDR circuit 130. The CDR and data inversion circuits can be implemented in known ways.

Figure 3:
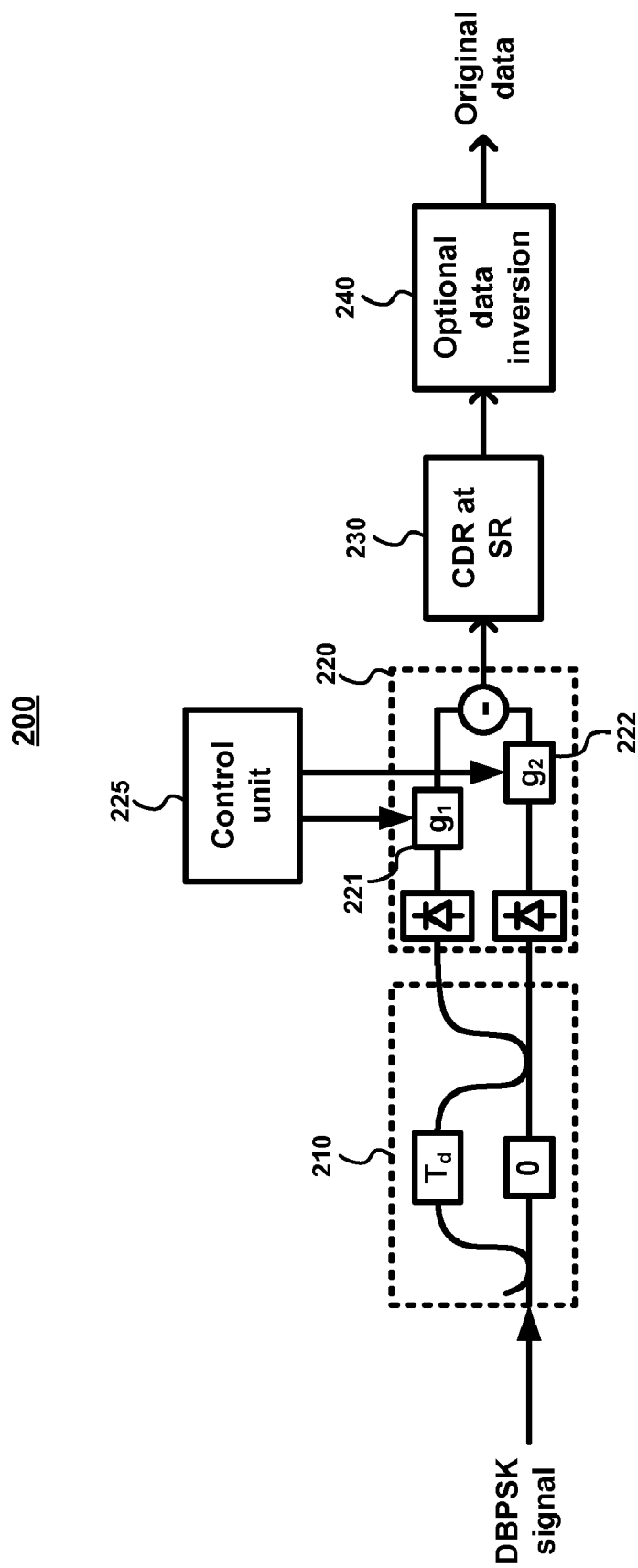
FIG. 3 is a block diagram of an exemplary embodiment of a DBPSK receiver comprising an electrical power imbalance module.

As a further alternative in accordance with the present invention, the power ratio adjustment can be achieved with electrical means. FIG. 3 shows a further exemplary embodiment of a receiver 200 in which the power ratio adjustment is carried out using electronic amplifier and/or attenuator circuitry. The receiver 200 comprises electronic amplifiers (and/or attenuators) 221 and 222 which amplify and/or attenuate the constructive and destructive outputs, respectively, of the ODI 210 after they have been detected and converted to electrical signals. The amplification and/or attenuation ($g_1$, $g_2$) provided by the amplifiers (and/or attenuators) 221 and 222 can be varied under the control of a control unit 225. A clock and data recovery (CDR) circuit 230 and an optional data inversion circuit 240, as described above, recover the original data.

Although the exemplary embodiment of FIG. 3 shows an electronic amplifier (and/or attenuator) for each of the constructive and destructive ports of the ODI 210, it is possible in accordance with the present invention to have alternative embodiments with an amplifier (attenuator) for only one of the ODI ports.

In an exemplary embodiment, the power adjustment can be set in accordance with the following relation:

$$\Delta(P_{con}/P_{des}) \approx (SR/FSR - 0.75) \times 15 \text{ dB}. \qquad (2)$$

For example, for a symbol rate (SR) of 43 Gb/s, the additional power ratio adjustments on $(P_{con}/P_{des})$ would be approximately 1.7 dB, −1.6 dB, and −4.8 dB for FSRs of 50 GHz, 67 GHz, and 100 GHz, respectively. If the FSR and SR obey the relationship (1), the additional power ratio adjustment $\Delta(P_{con}/P_{des})$ would have a range of approximately −5.25 dB to 1.8 dB.

Figure 4:
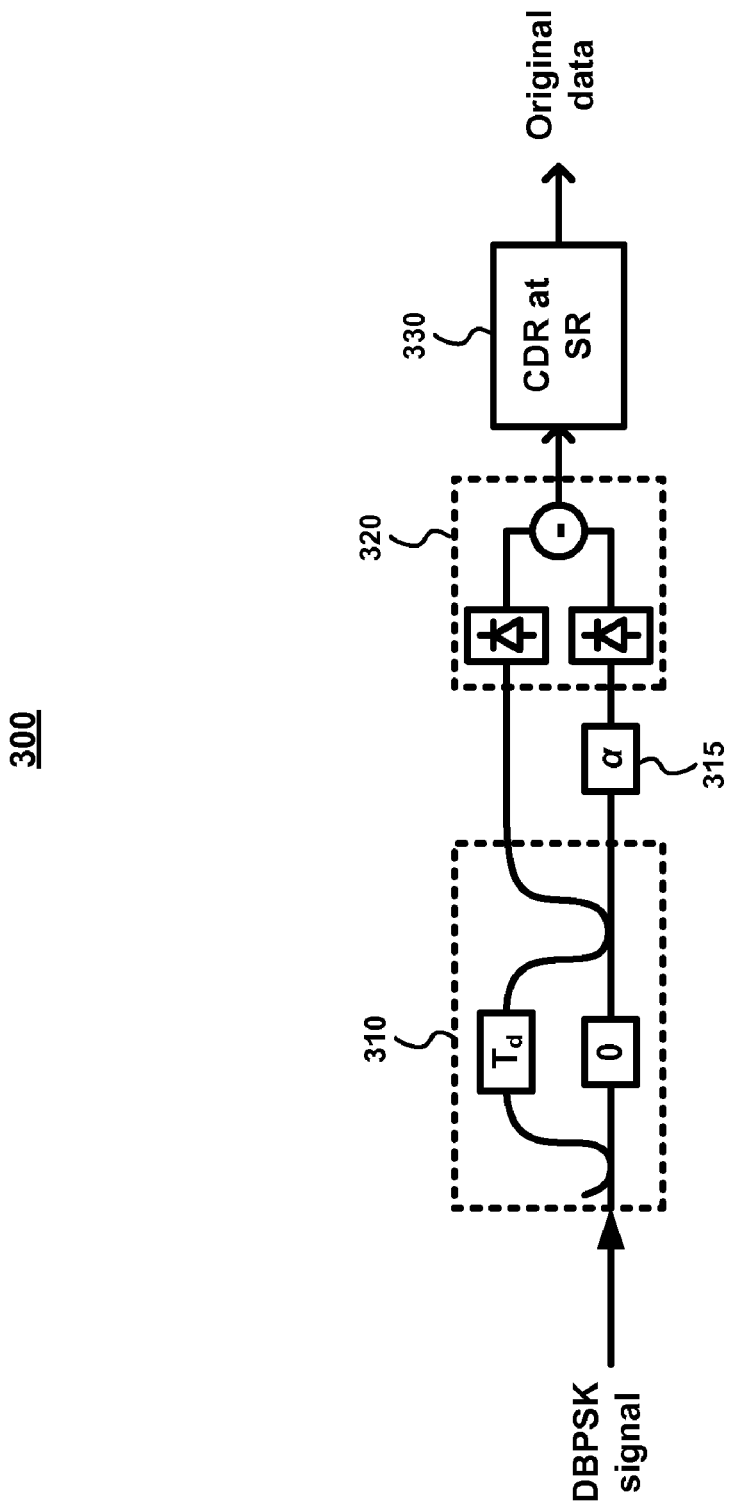
FIG. 4 is a block diagram of a further exemplary embodiment of a DBPSK receiver.

FIG. 4 is a block diagram of a further exemplary embodiment of a receiver 300 in accordance with the present invention. The receiver 300 comprises an ODI 310 demodulator with an FSR that is equal to the WDM channel spacing, $\Delta f_{min}$. Thus, in the case of 50 GHz channel spacing, the FSR of the ODI 310 would be 50 GHz, and $T_d$ would be 20 ps. As such, the FSR of the ODI 310 would be about 16% larger than the symbol rate of a 43 Gb/s DBPSK signal. According to the relationship (2), the desired power adjustment would be 1.65 dB, or $P_{des}$ would be decreased relative to $P_{con}$ by 1.65 dB, or by about 32%.

In the exemplary embodiment of FIG. 4, the additional power imbalance is introduced by a fixed optical attenuation 315 between the destructive output port of the ODI 310 and the balanced detector 320. The attenuation 315 can be implemented, for example, by imperfectly coupling the destructive port of the ODI 310 to the detector 320 to provide a fixed optical attenuation 315 to the corresponding signal. Alternatively, the attenuation 315 can be implemented with a discrete power imbalance module or block, as described above.

A CDR circuit 330, as described above, is shown for recovering the original data. A feature of the embodiment of FIG. 4 is that the optional data inversion circuit may no longer be needed since the ODI 310, whose FSR equals the WDM channel spacing $\Delta f_{min}$, may be configured to demodulate any one of the WDM channels with a fixed nominal condition. This feature can also be exploited to realize colorless operation where no change in ODI settings is needed when the wavelength of the received WDM signal changes.

Figure 5:
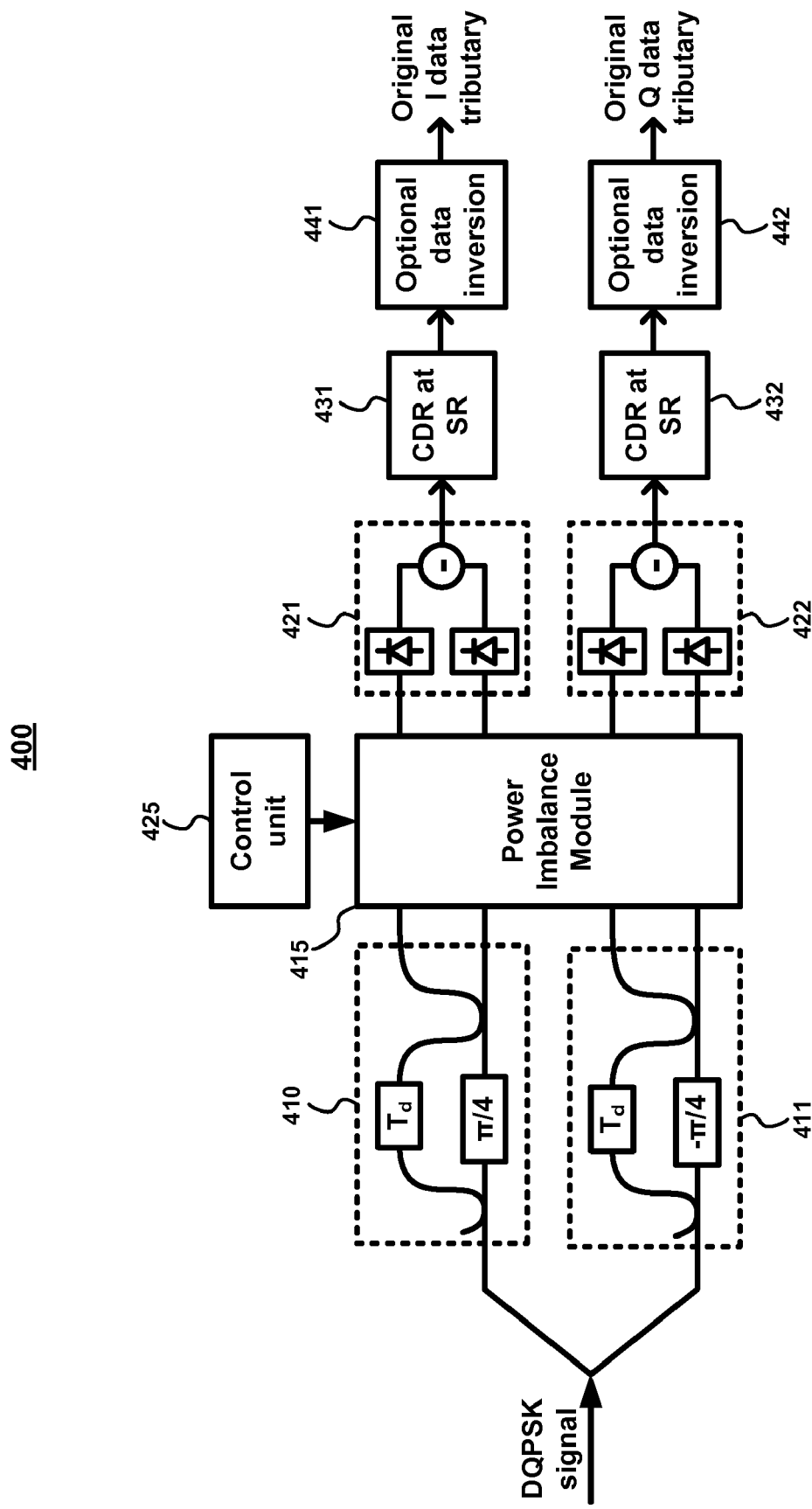
FIG. 5 is a block diagram of an exemplary embodiment of a differential quadrature phase shift keying (DQPSK) receiver.

FIG. 5 is a block diagram of yet a further exemplary embodiment of a receiver 400 in accordance with the present invention. The receiver 400 can demodulate differential quadrature phase-shift keying (DQPSK) signals, such as may be transmitted over a DWDM system with 50-GHz minimum channel spacing. For a DQPSK signal with a net data rate of 100 Gb/s, for example, the raw data rate is nominally 113 Gb/s and can range from about 107 Gb/s to about 125 Gb/s when the overhead for processes such as forward error correction (FEC) is included.

The receiver 400 comprises a DQPSK demodulator including a pair of ODIs 410 and 411 for demodulation of the in-phase and quadrature-phase components of the DQPSK signal. In an exemplary embodiment, the FSR of the DQPSK demodulator is 100 GHz. As such, the FSR of the ODIs 410 and 411 is about 77% larger than the symbol rate of a 113 Gb/s DQPSK signal. According to the relationship (2), the desired power adjustment would be −2.8 dB, or in other words, $P_{con}$ (of each ODI) would be decreased relative to $P_{des}$ (of each ODI) by 2.8 dB, or by about 48%.

The outputs of the ODIs 410 and 411 are provided to a power imbalance module 415. The in-phase and quadrature-phase outputs of the power imbalance module 415 are coupled to balanced detectors 421 and 422, respectively. The power imbalance module 415 can be implemented as described above by subjecting the signals at the constructive and/or destructive ports of the ODIs 410 and 411 to optical attenuation, such as by an optical attenuator or by providing imperfect optical coupling. Alternatively, as described above, an electrical implementation of a power imbalance module arranged after the conversion of the optical signals to electrical form can be used. Moreover, the power imbalance module 415 may provide a fixed power imbalance or a variable power imbalance under the control of a control unit 425.

CDR circuits 431 and 432 and optional data inversion circuits 441 and 442, as described above, follow the detectors 421 and 422, respectively, for recovering the original in-phase and quadrature-phase data tributaries.

As disclosed herein, the present invention offers good signal performance when receiving high spectral efficiency DPSK signals transmitted over conventional DWDM systems. Moreover, further embodiments of the present invention also provide other benefits such as a mechanism for optimizing the signal performance under different filtering conditions adaptively (without changing the delay of the ODI) by adjusting the power ratio, and allowing hitless receiver operation. Such embodiments of the present invention thereby provides overall system performance improvement and easy implementation when transmitting DPSK signals in high spectral efficiency systems.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. An optical receiver for receiving a differential phase-shift keyed (DPSK) optical signal from a wavelength-division multiplexed (WDM) optical transmission system, the optical receiver comprising:
    a demodulator, the demodulator including an optical delay interferometer (ODI) having:
        an optical input for receiving the DPSK optical signal,
        a constructive optical output associated with a constructive signal based on the DPSK optical signal, and
        a destructive optical output associated with a destructive signal based on the DPSK optical signal; and
    a power imbalance module that provides an additional relative power difference between the constructive and destructive signals,
    wherein the ODI has a free spectral range (FSR) that is larger than a symbol rate (SR) of the DPSK optical signal, and the additional relative power difference is dependent on the ratio between SR and FSR according to the following relation:

$$\Delta(P_{con}/P_{des}) \approx (SR/FSR - 0.75) \times 15 \text{ dB},$$

where $P_{con}$ is the power of the constructive signal, $P_{des}$ is the power of the destructive signal, and $\Delta(P_{con}/P_{des})$ is the additional power difference in dB.

2. The optical receiver of claim 1, wherein $1.15 \text{ SR} \leq \text{FSR} \leq 2.5 \text{ SR}$.

3. The optical receiver of claim 1, wherein the power imbalance module includes an optical attenuator.

4. The optical receiver of claim 3, wherein the optical attenuator is realized by imperfect optical coupling in at least one of the optical outputs of the ODI.

5. The optical receiver of claim 1 wherein the power imbalance module includes at least one of an electronic attenuator and an electronic amplifier.

6. The optical receiver of claim 1, wherein the DPSK optical signal is a differential binary phase-shift keying (DBPSK) signal.

7. The optical receiver of claim 1, wherein the DPSK optical signal is a differential quadrature phase-shift keying (DQPSK) signal.

8. The optical receiver of claim 1, wherein the FSR of the ODI is equal to a channel spacing of the WDM optical transmission system.

9. A method for receiving a differential phase-shift keyed (DPSK) optical signal from a wavelength-division multiplexed (WDM) optical transmission system, the method comprising:
    demodulating the DPSK optical signal with an optical delay interferometer (ODI) having:
        an optical input for receiving the DPSK optical signal,
        a constructive optical output associated with a constructive signal derived from the DPSK optical signal, and
        a destructive optical output associated with a destructive signal derived from the DPSK optical signal; and
    providing an additional relative power difference between the constructive and destructive signals,
    wherein the ODI has a free spectral range (FSR) that is larger than a symbol rate (SR) of the DPSK optical signal, and the additional relative power difference is dependent on the ratio between SR and FSR according to the following relation:

$$\Delta(P_{con}/P_{des}) \approx (SR/FSR - 0.75) \times 15 \text{ dB},$$

where $P_{con}$ is the power of the constructive signal, $P_{des}$ the power of the destructive signal, and $\Delta(P_{con}/P_{des})$ is the additional power difference in dB.

10. The method of claim 9, wherein $1.15 \text{ SR} \leq \text{FSR} \leq 2.5 \text{ SR}$.

11. The method of claim 9, wherein providing an additional relative power difference comprises optically attenuating at least one of the constructive and destructive signals.

12. The method of claim 11, wherein the at least one of the constructive and destructive signals is optically attenuated by imperfectly optically coupling at least one of the optical outputs of the ODI.

13. The method of claim 9, wherein providing an additional relative power difference comprises at least one of electronically attenuating and electronically amplifying at least one of the constructive and destructive signals.

14. The method of claim 9, wherein the DPSK optical signal is a differential binary phase-shift keying (DBPSK) signal.

15. The method of claim 9, wherein the DPSK optical signal is a differential quadrature phase-shift keying (DQPSK) signal.

16. The method of claim 9, wherein the FSR of the ODI is equal to a channel spacing of the WDM optical transmission system.

* * * * *